Dec. 10, 1929.  F. J. SCHWIMMER  1,739,046
GUARD FOR LUBRICATED SURFACES
Filed April 2, 1927
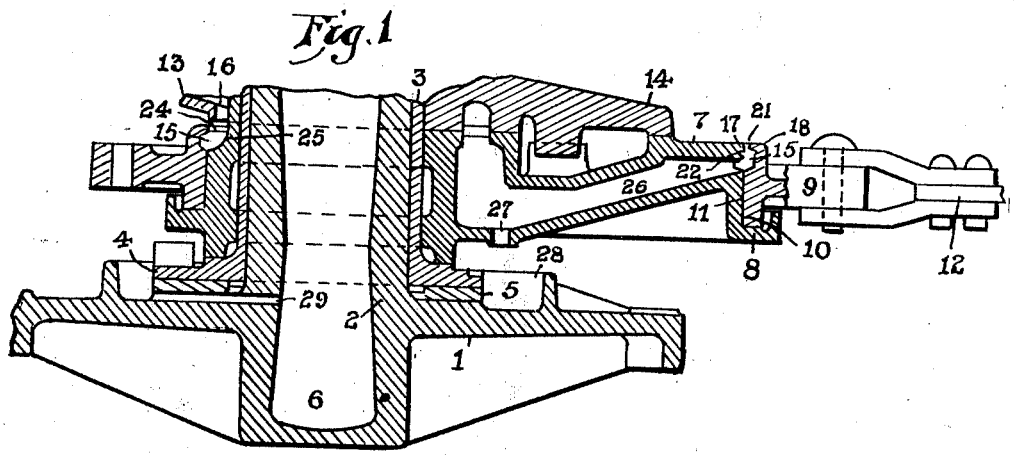
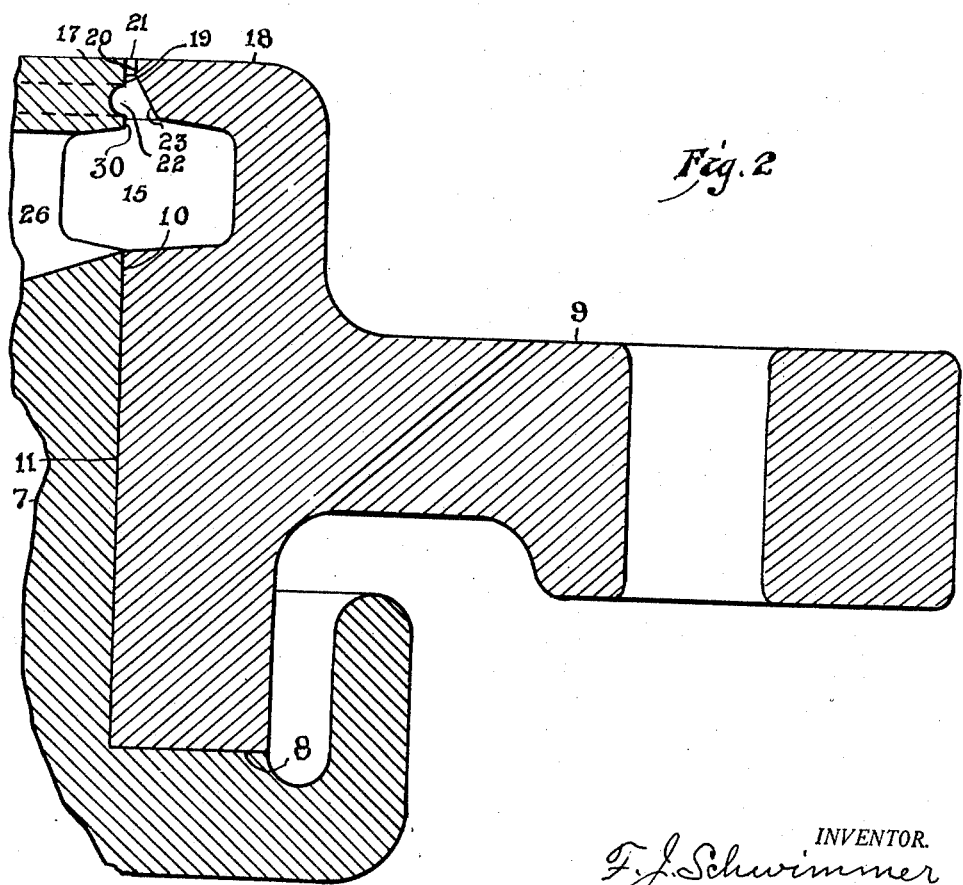
INVENTOR.
F. J. Schwimmer
BY
F. N. Barber
ATTORNEY.

Patented Dec. 10, 1929

1,739,046

UNITED STATES PATENT OFFICE

FREDRICK J. SCHWIMMER, OF TOLEDO, OHIO, ASSIGNOR TO THE NATIONAL SUPPLY COMPANY, OF TOLEDO, OHIO, A CORPORATION OF OHIO

GUARD FOR LUBRICATED SURFACES

Application filed April 2, 1927. Serial No. 180,422.

My invention relates to guards for lubricated surfaces, and is an improvement on the apparatus shown in Schwimmer and Wright's Patent No. 1,612,989 granted January 4, 1927. This patent like the present application shows horizontal eccentrics rotatable in straps which operate rods for actuating pumps. The vertical bearing surfaces between each eccentric and its strap is fed with oil from an annular groove at the upper edges of the bearing surfaces. It was found that some of the oil escaped over the top of the eccentric strap. It is the object of this invention to provide a guard which excludes dirt from the said groove and prevents the creeping, splashing or other method of the escape of oil upwardly over the top of the oil groove. This invention is not limited to use with pumping powers or with eccentrics.

Referring to the accompanying drawing, Fig. 1 is a central vertical section of the lower portion of a pumping power, and Fig. 2, an enlarged vertical sectional view of a portion of Fig. 1.

On the drawing, 1 designates a metal base having the upwardly extending or vertical spindle 2 which is surrounded by the bushing or sleeve 3 having the horizontal flange 4 resting on the friction ring 5 seated on the upper surface of the base 1. The spindle is hollow and has the oil reservoir 6 at its lower end.

The horizontal eccentric 7 is mounted on the bushing 3 and has the horizontal annular ledge 8 on which the eccentric strap 9 rests, the eccentric and strap having respectively the vertical mutual bearing surfaces 10 and 11. The eccentric may have connected thereto a number of pull-rods for actuating pumps. I have shown only one pull-rod marked 12.

A member 13 is mounted on the bushing 3 above the eccentric 7 and has an arm 14 which drives the eccentric in any suitable manner, as shown in the said patent, for example.

An oil groove or channel 15 is provided at the upper edges of the bearing surfaces 10 and 11. Oil may be supplied to the channel by the duct 16 in the driving member 13, the duct receiving oil from any suitable source. The channel is created by recessing the opposing faces of the eccentric and strap just above the top of the surfaces 10 and 11. The guard for preventing the entrance of dirt into the channel and the upward escape of the oil from the channel is preferably made by providing the opposing walls of the eccentric and strap respectively with the annular concentric flanges 17 and 18. These flanges lie between parallel planes. Their opposing edges 19 and 20 are separated by a small annular space 21 directly over the bearing surfaces 10 and 11. The edge 19 is provided with the annular recess 22 and the edge 20 has the annular incline 23 which slopes downwardly and outwardly from a line preferably slightly below the top of the strap 9 and slightly above the level of the recess 22. Oil is fed from the duct 16 and into the channel 15 through an opening 24 in the flange 17 and a recess 25 in the eccentric. Some of the oil works downwardly between the surfaces 10 and 11. Excess oil flows down the conduit 26 which extends downwardly and inwardly in the eccentric and from the point thereof farthest from the spindle 2. The oil from the conduit 26 drops through the opening 27 in its floor and into the annular pocket 28 which surrounds the flange 4 and the ring 5 and discharges through the duct 29 into the reservoir 6. The manner by which the oil is supplied to the channel 15 and reaches the bearing surfaces 10 and 11 and by which excess oil escapes forms no part of the present invention. The lubricating means for the apparatus of the present invention is fully shown and described in my application Serial No. 59,005, filed September 28, 1925.

The space 21 gives good results when one-sixteenth of an inch wide. It was found that, if the edges 19 and 20 are parallel, some oil would escape upwardly through the space 21. When the eccentric is rotating oil creeps up the inner side wall of the recess 15 and is thrown out by centrifugal force to the edge or surface 19 and would creep up that surface and out through the space 21, if the groove 22 were absent. The groove 22 provides a narrow lip 30 between itself and the lower face of the flange 17. The creeping oil gathers on the lip 30, and instead of creeping across the groove, is thrown by centrifugal force against the incline 23 down which it flows and again joins the oil in the channel 15. Any oil caused to be splashed against the edges 19 and 20 by slight opening and closing of the surfaces 10 and 11 will be returned to the channel by the action of the lip 30 and the incline 23.

The arm 14 forms no part of the present invention and may be supplemented by other driving means as shown in my said application Serial No. 59,005, or entirely replaced by other means.

I claim—

1. A horizontal eccentric member, a strap member bearing on the periphery thereof, an annular channel between the members and above the bearing surfaces between them and in communication with the bearing surfaces, and upward extensions of the members forming a top closure for the channel and having spaced apart opposing walls above the channel, the wall of the eccentric member having an annular groove facing the opposing wall, and the wall of the strap member having a downward and outward inclination opposite the groove.

2. A horizontal eccentric member, a strap member bearing on the periphery thereof, an annular channel between the members and above the bearing surfaces between them and in communication with the bearing surfaces, and upward extensions of the members forming a top closure for the channel and having spaced apart opposing walls above the channel, the wall of the eccentric member having an outwardly extending annular lip facing the opposing wall, and the wall of the strap having a downward and outward inclination opposite the lip to receive and return to the channel oil thrown from the lip.

3. A horizontal eccentric member, a strap member bearing on the periphery thereof, an annular channel formed in each of the adjacent faces of the eccentric member and strap and above the bearing faces between them, the said channel being in communication with the bearing surfaces, annular means carried by each member to form a cover for its respective portion of the annular channel, and an annular lip projecting outwardly from the annular means which is carried by the eccentric member.

4. A horizontal eccentric member, a strap member bearing on the periphery thereof, an annular channel formed in each of the adjacent faces of the eccentric member and strap and above the bearing faces between them, the said channel being in communication with the bearing surfaces, annular means carried by each member to form a cover for its respective portion of the annular channel, the covering means having a narrow annular space over the said bearing surface, and an annular lip projecting outwardly from the annular means which is carried by the eccentric member.

5. A horizontal eccentric member having a peripheral bearing surface, a strap member bearing on said bearing surface, an annular channel formed in the adjacent faces of the members above the bearing surfaces and in communication therewith, upward extensions of the members forming top closure members for the channel, the opposing faces of said upward extensions being spaced apart to form an annular space over the said bearing surfaces, and an annular lip projecting outwardly from the top closure member which is carried by the eccentric member.

In testimony whereof, I hereunto affix my signature.

FREDRICK J. SCHWIMMER.